Patented Apr. 18, 1939

2,154,471

UNITED STATES PATENT OFFICE 2,154,471

POLYHYDRIC ALCOHOL-POLYBASIC ACID RESIN AND METHOD OF MAKING SAME

Israel Rosenblum, New York, N. Y.

No Drawing. Application August 12, 1935, Serial No. 35,728

10 Claims. (Cl. 260—26)

The present invention relates to the production of practically neutral, solid polyhydric alcohol-polybasic acid resins, soluble in oils at varnish making temperatures and miscible at comparatively low heat with natural acidic resins and their esters, as well as with synthetic resins, like modified phenolic resins such as may be produced, for instance, in accordance with my Patent No. 1,808,716, my novel resins being compatible also with nitrocellulose lacquers.

It is well known that the natural resins, and particularly rosin, have an oil-solubilizing action on various substances, such as oil-insoluble phenol-formaldehyde resins, the rosin being itself very soluble in varnish oils and imparting such property to materials with which it is fluxed. The use of rosin in connection with glycerol-phthalic acid resins has also been suggested for the production of oil-soluble resins.

In fact, so wide has been the use of natural resins, and especially rosin, as a flux for various kinds of resinous substances, that it would naturally be expected to exert its usual fluxing action upon alkyd resins wherein the polybasic acid was a dibasic acid such as succinic acid, especially since it exerts such fluxing action on glycerol-phthalic acid resins, producing homogeneous oil-soluble resins therewith. I have, however, found that when, for example, glycerol, succinic acid and rosin are heated together in such proportions as should yield a commercially useful material, a homogeneous system cannot be obtained. When the glycerol is employed in considerable excess of the theoretical amount required to neutralize the rosin and succinic acid, for example, an excess of 50 per cent, a uniform one-layer system can be obtained, which, however, is not brittle at room temperatures, and on heating with drying oils, such as wood oil, leaves a considerable quantity of insoluble residue which chars during the heating. This material cannot therefore be regarded as a satisfactory or commercially useful material, not only because of the loss of material represented by the insoluble residue and the impairment of the quality of the varnish caused by the charring, but because the excess of glycerol tends to reduce the speed of drying of the varnish.

When approximately equivalent proportions of, for example glycerol on the one hand, and a mixture of abietic acid (or an acidic dry distilled natural resin) and succinic acid (or anhydride), on the other, are heated together in the manner that would normally be expected to yield a uniform, more or less neutral resin, the molecular proportions of succinic acid to abietic acid being approximately 0.6 to 1 mol of the first to 1 mol of the second, which are the proportions which should yield a resin having the desirable qualities, and especially the flexibility of a glycerol-succinic acid resin, and the oil-solubility of a glycerol-rosin ester, it is impossible to obtain a homogeneous fusible resin. No matter how carefully the heating is conducted, nor how vigorous the agitation the two-layer system forms, the heavier of the two layers being apparently a condensed glyceride of succinic acid, while the other is practically unchanged rosin. These results are obtained whether the reaction takes place at relatively low temperatures, or as high as 240° C. or even higher. This is true even when any two of the three materials are heated first and the third ingredient is added at a later stage; the two-layer system inevitably forms and leads to the formation of a gel of the glyceride of succinic acid and further heating causes charring of the glycerol-succinic acid condensate.

It is the object of the present invention to produce a resin composed of a polyhydric alcohol, preferably glycerol, an acidic natural resin, such as rosin, and a dibasic aliphatic acid, preferably succinic acid, the latter being present in relatively high proportion, which resin is uniform and homogeneous, has a low acid number, is solid and brittle at room temperature, is soluble in various varnish oils, is compatible with natural and synthetic resins and with nitrocellulose lacquers and produces hard, water resistant, flexible, glossy films and thus combines the desirable qualities of a glycerol-succinic acid resin and an ester gum.

I have found that if there is employed, in place of for example, the glycerol, a reaction product of such polyhydric alcohol with a volatile monobasic aliphatic acid of low molecular weight, preferably acetic acid, a mixed polyhydric alcohol ester of the acidic natural resin and succinic acid which is homogeneous, oil-soluble and solid at room temperatures can be readily obtained. This reaction product of for example the glycerol and acetic acid, may be obtained by heating approximately 1 mol of the alcohol with 1¼ mols of the acid; these proportions may however be varied considerably. The materials are heated at the boiling point under reflux, the boiling starting at about 135° C., but as soon as the reaction has proceeded to a certain extent, the boiling point drops gradually to about 125° C. due to the presence of water. The heating may be continued for about ten hours, whereupon a reaction product is obtained which is quite acid. In the case of the proportions given above, the acid number may be about 150, indicating a content of 15–20 per cent of free acetic acid. This mixture contains glycerol-acetic acid esters, free acetic acid and water, and while it may be partially distilled before it is further used in my process, I prefer to use the crude mixture without previous treatment. This mixture will be referred to hereinafter as glycerol-acetic acid reaction product.

The invention will be further described with the aid of the following examples which illustrate several ways of carrying out the invention, but it is to be understood that the invention is not limited thereto.

*Example 1*

Rosin, 300 gms. (1 mol.)
Succinic anhydride, 100 gms. (1 mol)
Glycerol—acetic acid reaction product—167 gms. (equivalent to 1 mol. of glycerol)

are heated gradually to about 240° C. in an inert atmosphere with good stirring. The initial cloudiness gradually disappears and a uniform one-layer system forms after about 5 hours at 240° C. From then on the esterification proceeds as usual, all the acetic acid being expelled during the process. A clear, brittle resin of an acid value of about 10 is obtained.

*Example 2*

Rosin, 300 gms. (1 mol.)
Succinic anhydride, 90 gms. (0.9 mol.)
Glycerol, acetic acid reaction product, 155 gms. (equivalent to 86 gms. glycerol)

Operation and results similar to Example No. 1.

*Example 3*

Same as in Example 1, only the content of succinic anhydride is reduced to 0.6 mol. to 1 mol. rosin.

Rosin, 300 gms.
Glycerol, acetic product, 121 gms. (corresponding to 67 gms. glycerol)
Succinic anhydride, 60 gms.

Operation similar to Example 1. A clear, brilliant resin of acid number less than 10 is obtained. This resin is soluble in wood oil as well as raw linseed oil and can be used in varnishes where the described superior characteristics, particularly increased elasticity of film, are desired.

It will be noted from the above description that the ratio of succinic acid to rosin may vary from 0.6 to 1 mol. of succinic acid to 1 mol of rosin, while the quantity of glycerol is approximately the theoretical amount required to neutralize the two acids. Although other proportions of succinic acid to rosin may be employed, I have found that within the limits indicated, very satisfactory resins can be obtained.

All of these resins, irrespective of the amount of succinic acid, are compatible with nitrocellulose and can be incorporated in lacquers, but for best results with wood oil varnishes, those resins which contain a relatively high proportion of succinic acid (0.9 to 1 mol of succinic acid to 1 mol of rosin) should be used in conjunction with ester gum (glycerol-rosin ester) and other oil-soluble resins. The resins having incorporated therein a lower proportion of succinic acid (0.6 to 0.8 mol of succinic acid to each mol of rosin) can be used alone, that is, without any addition, with wood oil—linseed oil varnishes.

In all cases the glycerol-succinic-rosin resins impart to the lacquer or varnish good setting and drying properties, very pale color and superior flexibility and elasticity of film.

Where hereinabove and in the claims I speak of succinic acid, it will be understood that the anhydride is included as a full equivalent.

I claim:

1. The method of producing oil-soluble resins, which consists essentially in heating an acid-reacting partial reaction product of glycerol and acetic acid with rosin and succinic acid until substantially all of the acetic acid has been expelled and a homogeneous resin which is solid at room temperature is obtained.

2. The method of producing oil-soluble resins of low acid number, which consists essentially in heating an acid-reacting partial reaction product of glycerol and acetic acid in an amount corresponding to approximately 1 mol of glycerol, with an equivalent proportion of a mixture of rosin and succinic acid, and continuing the heating until a homogeneous resin which is substantially free of acetic acid and is solid at room temperature is obtained.

3. The method of producing oil-soluble resins of low acid number, which comprises reacting 1 mol of glycerol with approximately 1¼ mols of acetic acid until an acid-reacting reaction mixture is obtained, and heating the resulting mixture with a mixture of rosin and succinic acid in approximately the amount required completely to neutralize all of the glycerol, and continuing heating until substantially all of the acetic acid has been expelled and a homogeneous resin which is solid at room temperature is obtained.

4. A method of producing oil-soluble resins, which consists in heating approximately 300 grams of rosin with from 60 to 100 grams of succinic anhydride and with from 121 to 167 grams of the reaction product of 1 mol of glycerol and 1¼ mols of acetic acid until substantially all of the acetic acid has been expelled and a clear, uniform resin which is solid at room temperature is obtained.

5. A solid, oil-soluble resin having an acid number of about 10 or below and obtained by heating essentially (1) the reaction product of 1 mol of glycerol and approximately 1¼ mols of acetic acid, (2) rosin, and (3) succinic acid, the product being substantially free of acetic acid and the proportions of glycerol being equivalent to the combined quantity of rosin and succinic acid.

6. A solid, oil-soluble resin having an acid number of about 10 or below and obtained by heating essentially (1) the reaction product of 1 mol of glycerol and approximately 1¼ mols of acetic acid, (2) rosin, and (3) succinic acid, the product being substantially free of acetic acid, the proportion of glycerol being approximately equivalent to the combined quantity of rosin and succinic acid, and the proportion of rosin to succinic acid being about 1 mol of the former to 0.6 to 1 mol of the latter.

7. A solid, homogeneous resin soluble in varnish oils and obtained by heating essentially (1) the acid-reacting partial reaction product of glycerol and a volatile saturated low molecular weight monobasic aliphatic acid having approximately two carbon atoms, (2) rosin and (3) succinic acid, the amount of glycerol being approximately equivalent to the combined quantity of rosin and succinic acid.

8. The method of producing oil-soluble resins, which consists essentially in heating an acid-reacting partial reaction product of glycerol and a volatile, saturated, low molecular weight monobasic aliphatic acid having approximately two carbon atoms with rosin and succinic acid until substantially all of the monobasic aliphatic acid has been expelled and a homogeneous resin which is solid at room temperature is obtained.

9. A solid, homogeneous resin soluble in varnish oils and consisting essentially of the reaction product of glycerol, rosin and succinic acid, the quantity of glycerol being approximately equivalent to that of the total acidic constituents, and the quantity of succinic acid being of the order of about 0.6 to 1 mol for each mol of the natural resin.

10. A solid, oil-soluble resin having an acid number of about 10 or below and obtained by heating essentially (1) 1 mol of rosin, (2) about 0.6 to 1 mol of succinic acid, and (3) such an amount of the acid-reacting, partial reaction product of glycerol and acetic acid as corresponds to a quantity of glycerol approximately equivalent to the combined amounts of rosin and succinic acid.

ISRAEL ROSENBLUM.